UNITED STATES PATENT OFFICE.

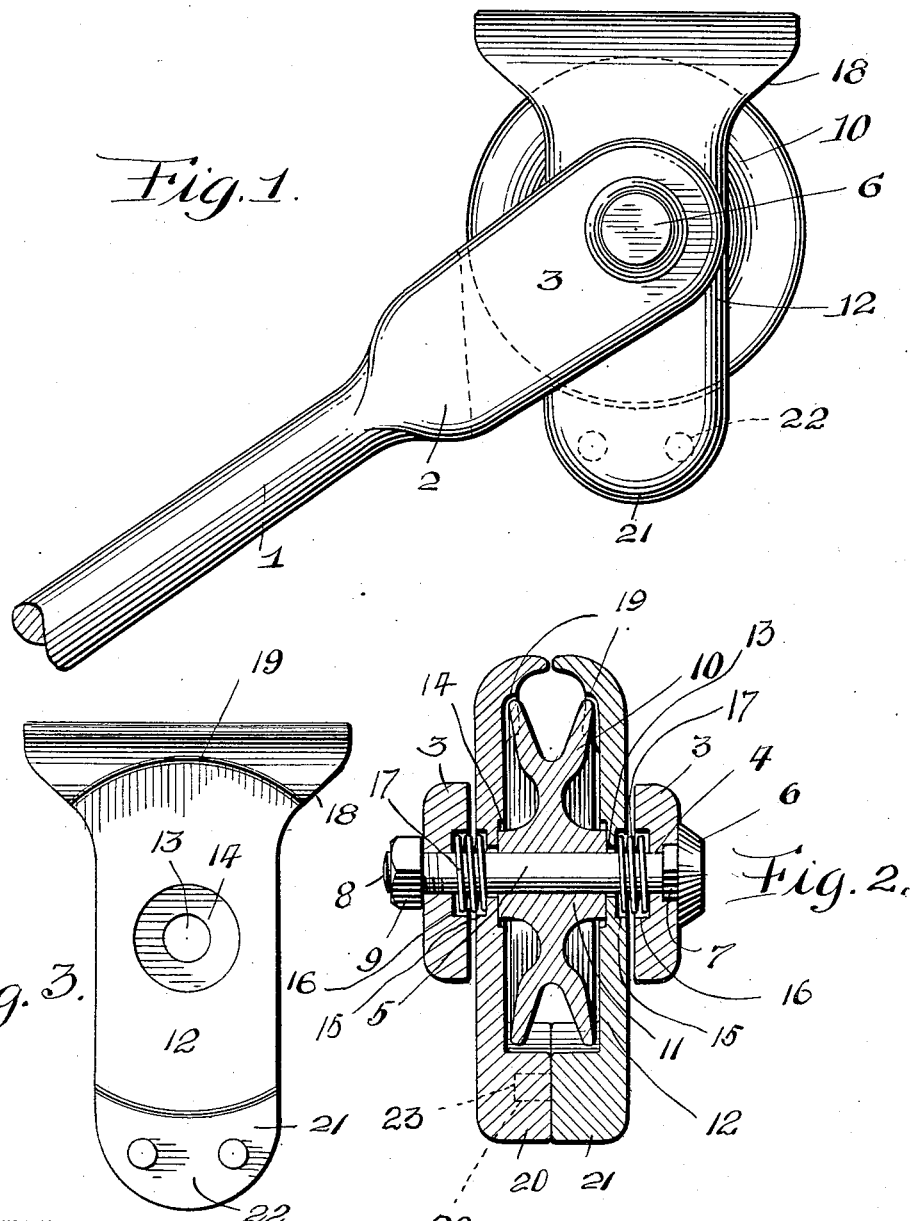

HENRY F. KUNIESKI AND MICHAEL SWIECICKI, OF PHILADELPHIA, PENNSYLVANIA.

TROLLEY.

1,018,198.  Specification of Letters Patent.  Patented Feb. 20, 1912.

Application filed September 16, 1911. Serial No. 649,666.

*To all whom it may concern:*

Be it known that we, HENRY F. KUNIESKI and MICHAEL SWIECICKI, subjects of the Emperor of Austria-Hungary, residing at Philadelphia, in the county of Philadelphia and State of Pennsylvania, have invented certain new and useful Improvements in Trolleys, of which the following is a specification, reference being had therein to the accompanying drawing.

This invention relates to trolleys, and the objects of our invention are to furnish a trolley harp with positive and reliable means, in a manner as will be hereinafter set forth, for retaining the trolley wheel of the harp in engagement with a trolley wire, and to provide yieldable means of the above type that will permit of the trolley wheel being easily removed from a wire.

Further objects of our invention are to provide a trolley attachment that can be used in connection with the present type of trolley harp, without interfering with trolley hangers, trolley frogs and the overhead construction of an electric railway, and to accomplish the above results by a mechanical construction that is inexpensive to manufacture, durable and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a side elevation of a trolley in accordance with this invention, Fig. 2 is a vertical cross sectional view of the same, and Fig. 3 is a side elevation of a detached guard adapted to form part of the trolley attachment.

The reference numeral 1 denotes a trolley pole having the upper end thereof enlarged, as at 2 and bifurcated or slotted to provide oppositely disposed arms 3. These arms have alining openings 4 for a journal pin or bolt 5. The pin 5 has a head 6 and a rectangular portion 7 at one end thereof, said rectangular portion engaging in one of the arms 3 to prevent the bolt from rotating in said arms. The opposite end of the bolt is threaded, as at 8 and provided with a nut 9 or other fastening means adapted to retain the bolt 5 in engagement with said arms.

Revolubly mounted upon the bolt 5 is a trolley wheel 10 of a conventional form adapted to travel against a trolley wire, and movably mounted upon said bolt, between the ends of the hub 11 of the wheel 10 and the arms 3 are vertical guards 12. These guards have openings 13 providing clearance for the bolt 5, and the inner faces of said guards have annular recesses 14 providing clearance for the ends of the hub 11 of the wheel 10. The outer faces of the guards 12 have annular recesses 15 confronting similar recesses 16 in the arms 3. Extending into these recesses are the end convolutions of coiled expansion springs 17 that encircle the bolt 5, between the guards 12 and the arms 3. These springs are adapted to normally retain the guards in engagement with the ends of the hub 15.

The upper ends of the guards are enlarged or flared, as at 18 with the enlarged ends thereof cut away, as at 19 to provide clearance for the rim of the wheel 10. The upper ends of the guards extend over the rim of the wheel 10 into proximity to each other and prevent the trolley wire from riding out of the groove of the wheel 10.

The lower ends of the guards 12 have the inner faces thereof provided with enlargements 20 and 21, the enlargement 21 having dowel pins 22 extending into sockets 23 provided therefor in the enlargement 20. The enlargements 20 are normally retained in engagement with each other by the coiled spring 17, consequently the guards are normally maintained in a vertical position with the upper inner bent edges thereof directly over the trolley wire against which the wheel 10 is adapted to travel.

The enlarged lower portion of the guards provide weighted lower ends which act to maintain the guards in a vertical position and prevent the rotation of the guards upon the shaft 6.

When a trolley wire hanger, frog or other overhead construction is encountered by the guards 12, said guards recede to pass the hanger, but are immediately restored to their normal vertical position by the springs 17. The upper ends of the guards can be easily snapped apart when the trolley wheel 10 is to be removed from the trolley wire, and we attach considerable importance to the lower enlarged ends of said guards and the dowel pins thereof, as one guard cannot swing in a vertical plane relatively to the other guard. The tension of the springs 17 is sufficient to normally maintain said guards in a vertical position, against the hub of the trolley wheel and said guards coöperate in forming an opening in conjunction with the trolley wheel which provides clearance for a trolley wire and prevents the wheel 10 from becoming accidentally displaced relatively to said wire.

What we claim is:—

In a trolley, the combination with a pole provided with a harp, of a bolt extending through said harp, means to prevent the rotative movement of said bolt, a wheel revolubly mounted upon said bolt, guards loosely mounted upon said bolt between the ends of the hub of said wheel and the arms of the harp, said guards having the inner faces thereof recessed to provide clearances for the hub of said wheel, the arms of said harp having recesses in their inner faces, coiled springs encircling said bolt and extending into said guards and into the recesses of the arms of the harp, said springs maintaining said guards against said hub, said guards having the upper ends thereof flared and bent inwardly to extend over said wheel and in proximity to each other, weighted enlargements carried by the lower ends of said guards thereby maintaining these latter normally in a vertical position, and dowel pins carried by one of said enlargements and extending into the other of said enlargements thereby preventing the vertical movement of one of the guards with respect to the other.

In testimony whereof we affix our signatures in the presence of two witnesses.

HENRY F. KUNIESKI.
MICHAEL SWIECICKI.

Witnesses:
Jos. F. Eckard,
Jos. G. Hughes.

Copies of this patent may be obtained for five cents each, by addressing the "Commissioner of Patents, Washington, D. C."